(12) United States Patent
Yin

(10) Patent No.: US 10,597,536 B2
(45) Date of Patent: Mar. 24, 2020

(54) MODIFIED HIGH-VISCOSITY ASPHALT, ROAD ASPHALT, PATCHING TAPE AND THEIR PREPARATION METHODS AND APPLICATION METHODS

(71) Applicant: XINJIANG XINGLU TECHNOLOGY Co., Ltd., Xinjiang (CN)

(72) Inventor: Qing Yin, Xinjiang (CN)

(73) Assignee: XINJIANG XINGLU TECHNOLOGY CO., LTD., Xinjiang (CN)

( * ) Notice: Subject to any disclaimer, the term of this patent is extended or adjusted under 35 U.S.C. 154(b) by 0 days.

(21) Appl. No.: 16/475,984

(22) PCT Filed: Apr. 2, 2018

(86) PCT No.: PCT/CN2018/081533
§ 371 (c)(1),
(2) Date: Jul. 3, 2019

(87) PCT Pub. No.: WO2018/210069
PCT Pub. Date: Nov. 22, 2018

(65) Prior Publication Data
US 2019/0352858 A1    Nov. 21, 2019

(30) Foreign Application Priority Data
May 18, 2017   (CN) .......................... 2017 1 0354217

(51) Int. Cl.
*C08L 95/00*   (2006.01)
*C08K 3/013*   (2018.01)
(Continued)

(52) U.S. Cl.
CPC .............. *C08L 95/00* (2013.01); *C08K 3/013* (2018.01); *C08K 3/04* (2013.01); *C08K 3/34* (2013.01);
(Continued)

(58) Field of Classification Search
CPC ........ C08L 95/00; C08L 95/005; C08L 21/00; C08L 57/02; C08L 91/00; C04B 26/26;
(Continued)

(56) References Cited

U.S. PATENT DOCUMENTS 5,827,568 A    10/1998  Wickett
7,833,339 B2 *  11/2010  Whitaker ............ C04B 20/1018
                                                    106/284.01
(Continued)

FOREIGN PATENT DOCUMENTS

CN    101353481 A    1/2009
CN    103951991 A    7/2014
(Continued)

*Primary Examiner* — Alexandra M Moore
(74) *Attorney, Agent, or Firm* — Craft Chu PLLC; Andrew W. Chu

(57) ABSTRACT

The modified high-viscosity asphalt has raw materials of a base asphalt mixture, an oil slurry, a rubber modifier, modified petroleum resin, an anti-stripping agent, and carbon black powder. The road asphalt patching tape has good high-temperature performance, excellent wear resistance to wheels, a very high friction coefficient and good low-temperature ductility. The road asphalt patching tape can be closely attached to and effectively repair the diseased road surface. In this way, the road asphalt patching tape is compactly connected to the diseased road surface, which can strengthen the diseased road surface, strengthen the overall strength of the cracked area, and prevent diseases, such as turtle shell-shaped cracks, pitted surfaces or the like, from deteriorating into potholes or the like.

18 Claims, 2 Drawing Sheets

TABLE 2

| Item | Friction Coefficient 1 | Friction Coefficient 2 | Friction Coefficient 3 | Average Value |
|---|---|---|---|---|
| Road asphalt patching tape of the present invention | 76 | 77 | 82 | 78.3 |
| Original road surface | 63 | 62 | 63 | 62.6 |

(51) Int. Cl.
*C08K 3/04* (2006.01)
*C08K 3/34* (2006.01)
*C08L 21/00* (2006.01)
*C08L 57/02* (2006.01)
*C08L 91/00* (2006.01)
*E01C 7/18* (2006.01)
*E01C 7/35* (2006.01)
*E01C 11/00* (2006.01)
*C04B 26/26* (2006.01)

(52) U.S. Cl.
CPC ............... *C08L 21/00* (2013.01); *C08L 57/02* (2013.01); *C08L 91/00* (2013.01); *E01C 7/187* (2013.01); *E01C 7/35* (2013.01); *E01C 11/005* (2013.01); *C04B 26/26* (2013.01); *C08J 2395/00* (2013.01); *C08J 2421/00* (2013.01); *C08J 2491/00* (2013.01); *C08J 2495/00* (2013.01); *C08L 2201/08* (2013.01); *C08L 2205/035* (2013.01); *C08L 2555/22* (2013.01); *C08L 2555/52* (2013.01); *C08L 2555/64* (2013.01)

(58) Field of Classification Search
CPC .......... E01C 7/187; E01C 7/35; E01C 11/005; C08K 3/013; C08K 3/04; C08K 3/34
See application file for complete search history.

(56) References Cited

U.S. PATENT DOCUMENTS

| | | | |
|---|---|---|---|
| 8,404,037 B2* | 3/2013 | Naidoo | C08L 95/00 106/273.1 |
| 2002/0111401 A1* | 8/2002 | Izumoto | C08L 95/00 524/59 |
| 2009/0088497 A1* | 4/2009 | Sasada | C08L 95/005 523/401 |

FOREIGN PATENT DOCUMENTS

| | | |
|---|---|---|
| CN | 104130588 A | 11/2014 |
| CN | 105542496 A | 5/2016 |
| CN | 106977968 A | 7/2017 |

* cited by examiner

TABLE 1

| Item | Softening point /°C | Penetration (25°C, 100g, 5s), 0.1mm | Ductility (5°C, 5cm/min) cm | Viscosity | Flash point °C |
|---|---|---|---|---|---|
| Embodiment 1 | 86-90 | 76-80 | 79-82 | 5.5-5.7 | >230 |
| Embodiment 3 | 88 | 78 | 79 | 5.7 | 240 |
| Embodiment 4 | 86 | 76 | 82 | 5.5 | 243 |
| Embodiment 7 | 90 | 80 | 81 | 5.6 | 250 |
| Existing SBS modified asphalt | ≥ 55 | 60-80 | ≥ 30 | 1.6 | ≥ 230 |

*FIG. 1*

TABLE 2

| Item | Friction Coefficient 1 | Friction Coefficient 2 | Friction Coefficient 3 | Average Value |
|---|---|---|---|---|
| Road asphalt patching tape of the present invention | 76 | 77 | 82 | 78.3 |
| Original road surface | 63 | 62 | 63 | 62.6 |

FIG. 2

MODIFIED HIGH-VISCOSITY ASPHALT, ROAD ASPHALT, PATCHING TAPE AND THEIR PREPARATION METHODS AND APPLICATION METHODS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the technical field of asphalt road surface maintenance, in particular to a modified high-viscosity asphalt and its preparation method, and a road asphalt patching tape and its preparation method and application method.

2. Description of Related Art Including Information Disclosed Under 37 CFR 1.97 and 37 CFR 1.98

Cracks occur as the asphalt road surface is damaged at an initial stage. If the cracks at the initial stage are not repaired in time, the damages to the asphalt road surface will be gradually deepened; and if phenomena, such as turtle shell-shaped cracks, pitted surfaces or the like, occur, the asphalt road surface has become a diseased road surface, and an asphalt sealing belt is not enough to repair the diseased road surface having turtle shell-shaped cracks, pitted surfaces or the like. Then, the diseases, such as turtle shell-shaped cracks, pitted surfaces or the like, may deteriorate and become serious diseases such as potholes, making it more difficult for subsequent repairs. In regions with large air temperature change (extremely cold and extremely hot air are cycled alternately), damages to the asphalt road surface may grow faster. Therefore, a diseased road surface having turtle shell-shaped cracks, pitted surfaces or the like is prone to the asphalt road surfaces in regions with large air temperature change, and it is necessary to handle the diseased road surface punctually.

Currently, the diseased road surface is repaired by the following methods. The first one is that the diseased road surface is repaired with the hot asphalt mixed with sands, and the mixture is poured once or twice a year. In spite of a low repair cost (25 CNY/$m^2$ to 30 CNY/$m^2$), this method may contaminate the road surface, fails to solve the actual road disease, has a poor repair result, and makes it difficult for subsequent processing. In addition, the repaired asphalt road still has a short service life. The second one is to dig and patch the diseased road surface with plant-mixed asphalt mixtures. This method has a repair cost from 75 CNY/$m^2$ to 120 CNY/$m^2$, and has disadvantages of accompanied various secondary diseases that are difficult for subsequent processing, a long construction period, and a large quantity of support equipment and persons. The repair cost of the latter method may be up to 100 CNY/$m^2$ to 150 CNY/$m^2$.

Therefore, there is a strong desire for a product that can punctually repair the diseased road surface and has a good repair result.

BRIEF SUMMARY OF THE INVENTION

The present invention provides a modified high-viscosity asphalt and its preparation method, and a road asphalt patching tape and its preparation method and application method, which can overcome deficiencies in the aforesaid prior art, and can effectively solve the problems of poor repair result and long construction period in the existing methods of repairing the diseased road surface that has turtle shell-shaped cracks, pitted surfaces or the like.

A first technical solution of the present invention is implemented by following measures. A modified high-viscosity asphalt, comprises, by weight parts, raw materials of: 100 parts of a base asphalt mixture, 10 to 14 parts of an oil slurry, 12 to 15 parts of a rubber modifier, 3 to 5 parts of modified petroleum resin, 2 to 4 parts of an anti-stripping agent, and 10 to 12 parts of carbon black powder, wherein the modified high-viscosity asphalt is acquired by performing the following steps: a first step of heating a required amount of base asphalt mixture to 185° C. to 190° C., adding a required amount of oil slurry to the heated base asphalt mixture, and stirring to obtain a primary stirring slurry; a second step of adding a required amount of rubber modifier to the primary stirring slurry and stirring to obtain a secondary stirring slurry, the stirring being performed for 2 hours to 4 hours under a temperature of 185° C. to 190° C.; a third step of shearing and milling the secondary stirring slurry to obtain a primary shear-milling slurry; a fourth step of adding a required amount of modified petroleum resin to the primary shear-milling slurry when the surface of the primary shear-milling slurry is smooth as observed, and shearing and milling to obtain a secondary shear-milling slurry; and a fifth step of adding a required amount of anti-stripping agent and carbon black powder to the secondary shear-milling slurry and stirring to obtain an asphalt mixture, and then obtaining the modified high-viscosity asphalt when a temperature of the asphalt mixture is lowered to 155° C. to 160° C.

Further optimizations and/or improvements to the first technical solution of the present invention will be described below.

The aforesaid base asphalt mixture is a mixture of No. 90 Karamay asphalt and Tahua No. 60 base asphalt with a volume ratio of 6-7:3-4.

The stirring in the fifth step is performed for 2 hours to 3 hours. Or/and, the rubber modifier is vulcanized rubber powder. Or/and, the stirring in the first step is performed at a speed of 55 rpm to 60 rpm. Or/and, the stirring in the second step is performed at a speed of 55 rpm to 60 rpm.

Or/and, the stirring in the fifth step is performed at a speed of 55 rpm to 60 rpm; and the shearing and milling in the third and fourth steps is preformed with a colloid miller at a speed of 1200 rpm to 1400 rpm.

A second technical solution of the present invention is implemented by following measures. A preparation method of a modified high-viscosity asphalt is provided. The modified high-viscosity asphalt comprises, by weight parts, raw materials of: 100 parts of a base asphalt mixture, 10 to 14 parts of an oil slurry, 12 to 15 parts of a rubber modifier, 3 to 5 parts of modified petroleum resin, 2 to 4 parts of an anti-stripping agent, and 10 to 12 parts of carbon black powder. The preparation method of the modified high-viscosity asphalt comprises: a first step of heating a required amount of base asphalt mixture to 185° C. to 190° C., adding a required amount of oil slurry to the heated base asphalt mixture, and stirring to obtain a primary stirring slurry; a second step of adding a required amount of rubber modifier to the primary stirring slurry and stirring to obtain a secondary stirring slurry, the stirring being performed for 2 hours to 4 hours under a temperature of 185° C. to 190° C.; a third step of shearing and milling the secondary stirring slurry to obtain a primary shear-milling slurry; a fourth step of adding a required amount of modified petroleum resin to the primary shear-milling slurry, and shearing and milling to obtain a secondary shear-milling slurry; and a fifth step of adding a required amount of anti-stripping agent and carbon black powder to the secondary shear-milling slurry and stirring to obtain an asphalt mixture, and then obtaining the modified high-viscosity asphalt when a temperature of the asphalt mixture is lowered to 155° C. to 160° C.

Further optimizations and/or improvements to the second technical solution of the present invention will be described below.

The aforesaid base asphalt mixture is a mixture of No. 90 Karamay asphalt and Tahua No. 60 base asphalt with a volume ratio of 6-7:3-4.

The stirring in the fifth step is performed for 2 hours to 3 hours. Or/and, the rubber modifier is vulcanized rubber powder. Or/and, the stirring in the first step is performed at a speed of 55 rpm to 60 rpm. Or/and, the stirring in the second step is performed at a speed of 55 rpm to 60 rpm. Or/and, the stirring in the fifth step is performed at a speed of 55 rpm to 60 rpm; and the shearing and milling in the third and fourth steps is preformed with a colloid miller at a speed of 1200 rpm to 1400 rpm.

A third technical solution of the present invention is implemented by following measures. A road asphalt patching tape using the modified high-viscosity asphalt according to the first technical solution is acquired by performing the following steps: a first step of dipping crack-proof fiber cloth into the modified high-viscosity asphalt, the crack-proof fiber cloth dipped with the modified high-viscosity asphalt having a thickness of 3 mm to 5 mm; a second step of bonding a high-temperature-resistant single-silicon white film on a lower surface of the crack-proof fiber cloth dipped with the modified high-viscosity asphalt; a third step of uniformly bestrewing gravels having a particle size of 5 mm to 10 mm on an upper surface of the crack-proof fiber cloth dipped with the modified high-viscosity asphalt, the crack-proof fiber cloth dipped with the modified high-viscosity asphalt being bestrewed on its upper surface with 6 kg to 8 kg of gravels per square meter; a fourth step of crushing the crack-proof fiber cloth that has been bestrewed with the gravels in the third step and embedding the gravels into the crack-proof fiber cloth dipped with the modified high-viscosity asphalt; and a fifth step of cooling the crack-proof fiber cloth obtained in the fourth step to 20° C. to 40° C. to obtain the road asphalt patching tape.

Further optimizations and/or improvements to the third technical solution of the present invention will be described below.

In the second step, the high-temperature-resistant single-silicon white film is bonded on the lower surface of the crack-proof fiber cloth dipped with the modified high-viscosity asphalt via silicone oil. Or/and, the gravels are basalt chips. Or/and, in the fourth step, the depth of embedding the gravels into the crack-proof fiber cloth dipped with the modified high-viscosity asphalt is one quarter to one third of the height of the gravel.

A fourth technical solution of the present invention is implemented by following measures. A preparation method of a road asphalt patching tape comprises: a first step of dipping crack-proof fiber cloth into the modified high-viscosity asphalt, the crack-proof fiber cloth dipped with the modified high-viscosity asphalt having a thickness of 3 mm to 5 mm; a second step of bonding a high-temperature-resistant single-silicon white film on a lower surface of the crack-proof fiber cloth dipped with the modified high-viscosity asphalt; a third step of uniformly bestrewing gravels having a particle size of 5 mm to 10 mm on an upper surface of the crack-proof fiber cloth dipped with the modified high-viscosity asphalt, the crack-proof fiber cloth dipped with the modified high-viscosity asphalt being bestrewed on its upper surface with 6 kg to 8 kg of gravels per square meter; a fourth step of crushing the crack-proof fiber cloth that has been bestrewed with the gravels in the third step and embedding the gravels into the crack-proof fiber cloth dipped with the modified high-viscosity asphalt; and a fifth step of cooling the crack-proof fiber cloth obtained in the fourth step to 20° C. to 40° C. to obtain the road asphalt patching tape.

Further optimizations and/or improvements to the fourth technical solution of the present invention will be described below.

In the second step, the high-temperature-resistant single-silicon white film is bonded on the lower surface of the crack-proof fiber cloth dipped with the modified high-viscosity asphalt via silicone oil. Or/and, the gravels are basalt chips. Or/and, in the fourth step, the depth of embedding the gravels into the crack-proof fiber cloth dipped with the modified high-viscosity asphalt is one quarter to one third of the height of the gravel.

A fifth technical solution of the present invention is implemented by following measures. An application method of a road asphalt patching tape, comprises: a first step of cleaning up a diseased road surface to make the diseased road surface clean, having no dust or sands or stones; a second step of removing the high-temperature-resistant single-silicon white film on a lower surface of the road asphalt patching tape, and attaching the lower surface of the road asphalt patching tape where the high-temperature-resistant single-silicon white film is removed on a treatment surface of the diseased road surface, so as to completely cover the treatment surface of the diseased road surface; and a third step of applying force to an attaching place after completion of the attaching, so that edges of the road asphalt patching tape are closely attached to the diseased road surface.

Firstly, the road asphalt patching tape according to the present invention has good high-temperature performance, excellent wear resistance to wheels, a very high friction coefficient and good low-temperature ductility, so that the road asphalt patching tape according to the present invention can be closely attached to and effectively repair the diseased road surface. In this way, the road asphalt patching tape according to the present invention is closely connected to the diseased road surface, which can strengthen the diseased road surface, strengthen the overall strength of the cracked area, prevent the diseases, such as turtle shell-shaped cracks, pitted surfaces or the like, from deteriorating into potholes or the like, and completely seal water from the road surface diseases. Secondly, if the diseased road surface is repaired with the road asphalt patching tape according to the present invention, the service life of the road can be effectively extended by 5 to 8 years. Compared with the existing repair method, the road asphalt patching tape according to the embodiments of the present invention can better extend the service life of the road, and has wider applicability, especially in regions with large air temperature changes. And thirdly, when the road asphalt patching tape according to the present invention is used to repair the diseased road surface having turtle shell-shaped cracks, pitted surfaces or the like, it requires a shorter construction time than the conventional repair method, needs no large equipment, and is simple in construction. Moreover, the road is open to traffic as soon as the cracks are patched, and the cracks can be patched anytime and anywhere, without causing any damage to the original asphalt road surface. Therefore, the road asphalt patching tape according to the present invention has a wide application prospect.

BRIEF DESCRIPTION OF THE SEVERAL VIEWS OF THE DRAWINGS

FIG. 1 is a graph illustration of Table 1 for results of the modified high-viscosity asphalt of the present invention and the product technical requirements of the existing modified asphalt.

FIG. 2 is a graph illustration of Table 2 for the friction coefficient of the road asphalt patching tape prepared with the modified high-viscosity asphalt.

DETAILED DESCRIPTION OF THE INVENTION

The present invention is not limited by the following embodiments, and specific embodiments may be determined according to the technical solutions of the present invention and actual situations. The various chemical reagents and chemical substances mentioned in the present invention are common chemical reagents and chemical substances known in the prior art unless otherwise specified. The percentages in the present invention are mass percentages unless otherwise specified. The solution in the present invention is an aqueous solution in which the solvent is water unless otherwise specified; for example, the hydrochloric acid solution is an aqueous solution of hydrochloric acid.

The present invention is further described below in conjunction with embodiments.

Embodiment 1

The modified high-viscosity asphalt, comprises, by weight parts, raw materials of: 100 parts of a base asphalt mixture, 10 to 14 parts of an oil slurry, 12 to 15 parts of a rubber modifier, 3 to 5 parts of modified petroleum resin, 2 to 4 parts of an anti-stripping agent, and 10 to 12 parts of carbon black powder. The modified high-viscosity asphalt is acquired by following preparation method, comprising: a first step of heating a required amount of the base asphalt mixture to 185° C. to 190° C., adding a required amount of the oil slurry to the heated base asphalt mixture, and stirring to obtain a primary stirring slurry; a second step of adding a required amount of the rubber modifier to the primary stirring slurry and stirring to obtain a secondary stirring slurry, the stirring being performed for 2 hours to 4 hours under a temperature of 185° C. to 190° C.; a third step of shearing and milling the secondary stirring slurry to obtain a primary shear-milling slurry; a fourth step of adding a required amount of the modified petroleum resin to the primary shear-milling slurry to form a primary shear-milling slurry with a smooth surface (the surface of the primary shear-milling slurry is smooth as observed), and shearing and milling to obtain a secondary shear-milling slurry; and a fifth step of adding a required amount of the anti-stripping agent and carbon black powder to the secondary shear-milling slurry and stirring to obtain an asphalt mixture, and then obtaining the modified high-viscosity asphalt when a temperature of the asphalt mixture is lowered to 155° C. to 160° C.

The road asphalt patching tape acquired according to the embodiment 1 has good high-temperature performance, excellent wear resistance to wheels, a very high friction coefficient and good low-temperature ductility. The road asphalt patching tape according to the present invention can be closely attached to and effectively repair the diseased road surface. In this way, the road asphalt patching tape according to the present invention can be closely connected to the diseased road surface, which can strengthen the diseased road surface, strengthen the overall strength of the cracked area, prevent the diseases, such as turtle shell-shaped cracks, pitted surfaces or the like, from deteriorating into potholes or the like, and completely seal water from the road surface diseases.

Embodiment 2

The modified high-viscosity asphalt, comprises, by weight parts, raw materials of: 100 parts of a base asphalt mixture, 10 or 14 parts of an oil slurry, 12 or 15 parts of a rubber modifier, 3 or 5 parts of modified petroleum resin, 2 or 4 parts of an anti-stripping agent, and 10 or 12 parts of carbon black powder. The modified high-viscosity asphalt is acquired by following preparation method, comprising: a first step of heating a required amount of the base asphalt mixture to 185° C. or 190° C., adding a required amount of the oil slurry to the heated base asphalt mixture, and stirring to obtain a primary stirring slurry; a second step of adding a required amount of the rubber modifier to the primary stirring slurry and stirring to obtain a secondary stirring slurry, the stirring being performed for 2 hours or 4 hours under a temperature of 185° C. or 190° C.; a third step of shearing and milling the secondary stirring slurry to obtain a primary shear-milling slurry; a fourth step of adding a required amount of the modified petroleum resin to the primary shear-milling slurry when the surface of the primary shear-milling slurry is smooth as observed, and shearing and milling to obtain a secondary shear-milling slurry; and a fifth step of adding a required amount of the anti-stripping agent and carbon black powder to the secondary shear-milling slurry and stirring to obtain an asphalt mixture, and then obtaining the modified high-viscosity asphalt when a temperature of the asphalt mixture is lowered to 155° C. or 160° C.

Embodiment 3

The modified high-viscosity asphalt, comprises, by weight parts, raw materials of: 100 parts of a base asphalt mixture, 14 parts of an oil slurry, 12 parts of a rubber modifier, 3 parts of modified petroleum resin, 4 parts of an anti-stripping agent, and 12 parts of carbon black powder. The modified high-viscosity asphalt is acquired by following preparation method, comprising: a first step of heating a required amount of the base asphalt mixture to 190° C., adding a required amount of the oil slurry to the heated base asphalt mixture, and stirring to obtain a primary stirring slurry; a second step of adding a required amount of the rubber modifier to the primary stirring slurry and stirring to obtain a secondary stirring slurry, the stirring being performed for 4 hours under a temperature of 185° C.; a third step of shearing and milling the secondary stirring slurry to obtain a primary shear-milling slurry; a fourth step of adding a required amount of the modified petroleum resin to the primary shear-milling slurry when the surface of the primary shear-milling slurry is smooth as observed, and shearing and milling to obtain a secondary shear-milling slurry; and a fifth step of adding a required amount of the anti-stripping agent and carbon black powder to the secondary shear-milling slurry and stirring to obtain an asphalt mixture, and then obtaining the modified high-viscosity asphalt when a temperature of the asphalt mixture is lowered to 160° C.

Embodiment 4

The modified high-viscosity asphalt, comprises, by weight parts, raw materials of: 100 parts of a base asphalt mixture, 14 parts of an oil slurry, 15 parts of a rubber modifier, 3 parts of modified petroleum resin, 2 parts of an anti-stripping agent, and 10 parts of carbon black powder. The modified high-viscosity asphalt is acquired by following preparation method, comprising: a first step of heating a required amount of the base asphalt mixture to 185° C., adding a required amount of the oil slurry to the heated base asphalt mixture, and stirring to obtain a primary stirring slurry; a second step of adding a required amount of the rubber modifier to the primary stirring slurry and stirring to obtain a secondary stirring slurry, the stirring being performed for 2 hours under a temperature of 190° C.; a third step of shearing and milling the secondary stirring slurry to obtain a primary shear-milling slurry; a fourth step of adding a required amount of the modified petroleum resin to the primary shear-milling slurry when the surface of the primary shear-milling slurry is smooth as observed, and shearing and milling to obtain a secondary shear-milling slurry; and a fifth step of adding a required amount of the anti-stripping agent and carbon black powder to the secondary shear-milling slurry and stirring to obtain an asphalt mixture, and then obtaining the modified high-viscosity asphalt when a temperature of the asphalt mixture is lowered to 155° C.

Embodiment 5

As optimization of the aforesaid embodiment, the base asphalt mixture is a mixture of No. 90 Karamay asphalt and Tahua No. 60 base asphalt with a volume ratio of 6-7:3-4.

The Tahua No. 60 base asphalt is a base asphalt produced by Sinopec Tahe Branch.

Embodiment 6

As optimization of the aforesaid embodiment, the stirring in the fifth step is performed for 2 hours to 3 hours. Or/and, the rubber modifier is vulcanized rubber powder. Or/and, the stirring in the first step is performed at a speed of 55 rpm to 60 rpm. Or/and, the stirring in the second step is performed at a speed of 55 rpm to 60 rpm. Or/and, the stirring in the fifth step is performed at a speed of 55 rpm to 60 rpm; and the shearing and milling in the third and fourth steps is preformed with a colloid miller at a speed of 1200 rpm to 1400 rpm.

Embodiment 7

The modified high-viscosity asphalt, comprises, by weight parts, raw materials of: 100 parts of a base asphalt mixture, 13 parts of an oil slurry, 14 parts of a rubber modifier, 4 parts of modified petroleum resin, 3 parts of an anti-stripping agent, and 11 parts of carbon black powder. The modified high-viscosity asphalt is acquired by following preparation method, comprising: a first step of heating a required amount of the base asphalt mixture to 190° C., adding a required amount of the oil slurry to the heated base asphalt mixture, and stirring to obtain a primary stirring slurry; a second step of adding a required amount of the rubber modifier to the primary stirring slurry and stirring to obtain a secondary stirring slurry, the stirring being performed for 2 hours under a temperature of 185° C.; a third step of shearing and milling the secondary stirring slurry to obtain a primary shear-milling slurry; a fourth step of adding a required amount of the modified petroleum resin to the primary shear-milling slurry when the surface of the primary shear-milling slurry is smooth as observed, and shearing and milling to obtain a secondary shear-milling slurry; and a fifth step of adding a required amount of the anti-stripping agent and carbon black powder to the secondary shear-milling slurry and stirring to obtain an asphalt mixture, and then obtaining the modified high-viscosity asphalt when a temperature of the asphalt mixture is lowered to 160° C., wherein the base asphalt mixture is a mixture of No. 90 Karamay asphalt and Tahua No. 60 base asphalt with a volume ratio of 7:3, and the rubber modifier is vulcanized rubber powder.

Embodiment 8

The road asphalt patching tape is acquired by following preparation method, comprising: a first step of dipping a crack-proof fiber cloth into the modified high-viscosity asphalt so as to form a dipped crack-proof fiber cloth, the crack-proof fiber cloth dipped with the modified high-viscosity asphalt having a thickness of 3 mm to 5 mm; a second step of bonding a high-temperature-resistant single-silicon white film on a lower surface of the crack-proof fiber cloth dipped with the modified high-viscosity asphalt; a third step of uniformly bestrewing gravels having a particle size of 5 mm to 10 mm on an upper surface of the crack-proof fiber cloth dipped with the modified high-viscosity asphalt so as to form a bestrewed fiber cloth, the crack-proof fiber cloth dipped with the modified high-viscosity asphalt being bestrewed on its upper surface with 6 kg to 8 kg of gravels per square meter; a fourth step of crushing the crack-proof fiber cloth that has been bestrewed with the gravels in the third step and embedding the gravels into the crack-proof fiber cloth dipped with the modified high-viscosity asphalt so as to form an embedded fiber cloth; and a fifth step of cooling the crack-proof fiber cloth obtained in the fourth step to 20° C. to 40° C. to obtain the road asphalt patching tape.

When the road asphalt patching tape according to the present invention is used to repair the diseased road surface having turtle shell-shaped cracks, pitted surface or the like, cutting, attaching and patching can be performed immediately according to the diseased area size of the turtle shell-shaped cracks and pitted surfaces, which requires less construction time, needs no large equipment, is simple in construction, and causes no damage to the original asphalt road surface. In addition, the road asphalt patching tape according to this embodiment can be closely attached to the diseased road surface, which can strengthen the diseased road surface, strengthen the overall strength of the cracked area, prevent the diseases, such as turtle shell-shaped cracks, pitted surfaces or the like, from deteriorating into potholes or the like, and completely seal water from the road surface diseases. The cost of repairing the diseased road surface by the road asphalt patching tape according to this embodiment is 80 $CNY/m^2$ to 95 $CNY/m^2$, which is lower than the cost of the existing repair method (100 $CNY/m^2$ to 150 $CNY/m^2$). Furthermore, if the diseased road surface is repaired with the road asphalt patching tape according to this embodiment, the service life of the road can be effectively extended by 5 to 8 years; thus, compared with the existing repair method, the road asphalt patching tape according to this embodiment can better extend the service life of the road.

Embodiment 9

As optimization of the embodiment 8, in the second step, the high-temperature-resistant single-silicon white film is bonded on a lower surface of the crack-proof fiber cloth dipped with the modified high-viscosity asphalt via silicone oil. Or/and, the gravels are basalt chips. Or/and, in the fourth step, the depth of embedding the gravels into the crack-proof fiber cloth dipped with the modified high-viscosity asphalt is one quarter to one third of the height of the gravel.

Setting of the depth of embedding the gravels into the crack-proof fiber cloth dipped with the modified high-viscosity asphalt enables the road asphalt patching tape of the present invention to have a comparatively good wear resistance to wheels.

The upper gravels surface of the road asphalt patching tape according to this embodiment satisfies the requirements of the road friction coefficient, and keeps the same color with the road surface. Thus, using the road asphalt patching tape according to this embodiment causes no damage to the overall appearance of the road surface.

Embodiment 10

An application method of the road asphalt patching tape comprises: a first step of cleaning up a diseased road surface to make the diseased road surface clean, having no dust or sands or stones; a second step of removing the high-temperature-resistant single-silicon white film on a lower surface of the road asphalt patching tape, and attaching the lower surface of the road asphalt patching tape where the high-temperature-resistant single-silicon white film is removed on a treatment surface of the diseased road surface, so as to completely cover the treatment surface of the diseased road surface; and a third step of applying force to an attaching place after completion of the attaching, so that edges of the road asphalt patching tape are closely attached to the diseased road surface.

The road is open to traffic as soon as the attaching is completed.

The road asphalt patching tape may be manually struck by a rubber hammer at its edges or crushed by a machine to make it closely attach to the asphalt road surface.

A performance evaluation of the road asphalt patching tape acquired according to above embodiments of the present invention is carried out, and the evaluation tests are as follows.

1. High-Temperature Performance Test

The high-temperature performance of the road asphalt patching tape is mainly evaluated by the high-temperature performance of main materials adopted in producing the road asphalt patching tape. As long as the main materials satisfy the actual road requirements, the road asphalt patching tape can also meet the requirements. Thus, the high-temperature evaluation for the road asphalt patching tape is only carried out for its main materials. The main materials of the road asphalt patching tape in the present invention are modified high-viscosity asphalt and crack-proof fiber cloth, and the technical indexes of the modified high-viscosity asphalt are evaluated by the existing evaluation method of the modified asphalt. The evaluation test results of the modified high-viscosity asphalt of the present invention and the product technical requirements of the existing modified asphalt are as shown in Table 1 of FIG. 1. In Table 1, the softening point is measured according to the asphalt softening point T0606, the penetration is measured according to the asphalt penetration T0604, the ductility is measured according to the asphalt ductility T0605, the viscosity is measured according to T0625, and the flash point is measured according to the asphalt flash point T0611.

It can be seen from data in Table 1 that the softening point, penetration, ductility, viscosity and flash point of the modified high-viscosity asphalt of the present invention meet the product technical requirements of the existing modified asphalt. Meanwhile, it can be seen that the penetration of the modified high-viscosity asphalt of the present is 80, which indicates that the modified high-viscosity asphalt of the present invention is soft, and the softening point of the modified high-viscosity asphalt of the present invention reaches 90° C., which indicates that the modified high-viscosity asphalt of the present invention has good high-temperature resistance. Moreover, the crack-proof fiber cloth can withstand a temperature of 220° C. or higher without deformation, which indicates that the road asphalt patching tape of the present invention has good high-temperature resistance.

2. Abrasion Test

The modified high-viscosity asphalt acquired in embodiments 1, 3, 4 and 7 is subjected to the abrasion test according to the road asphalt patching tape prepared according to the method described in embodiment 8. The abrasion test is an evaluation to the adhesion and wear resistance to wheels of the gravels in the road asphalt patching tape. The gravels are basalt gravels, and the depth of embedding the basalt gravels into the crack-proof fiber cloth dipped with the modified high-viscosity asphalt is one third of the size of basalt gravels. The test results show that the abrasion test data for the road asphalt patching tape of the present invention is that the abrasion loss is 8.2% to 8.6%.

The road asphalt patching tape of the present invention has an abrasion loss of 8.2% to 8.6%, and this indicates that the road asphalt patching tape has good adhesion to the road surface and the asphalt-gravels of the road asphalt patching tape, so that the road asphalt patching tape of the present invention has excellent wear resistance to wheels.

3. Friction Coefficient Measurement

One of the most important features of the road is the fast driving speed, and the high-speed driving of the vehicle puts strict requirements on anti-sliding ability and safety of the road. An important technical index reflecting the anti-sliding ability of the road surface is the value of the friction coefficient of the road surface. When the diseased road surface is treated with the road asphalt patching tape of the present invention, the road asphalt patching tape must be attached to the diseased road surface in a large area, so the friction coefficient of the road asphalt patching tape of the present invention is particularly important. Since the modified high-viscosity asphalt acquired in embodiment 7 has relatively good high-temperature performance, wear resistance to wheels and low-temperature ductility, the friction coefficient of the road asphalt patching tape prepared with the modified high-viscosity asphalt acquired according to the embodiment 7 by the preparation method of embodiment 8 is shown in Table 2. The value of the friction coefficient is measured using a pendulum meter, and three points are tested to obtain an average value.

It can be seen from Table 2 of FIG. 2 that the road asphalt patching tape of the present invention attached to the diseased road surface still has a very high friction coefficient and has a BPN value of 78.3 even after undergoing a large number of repetitive vehicle travels. In addition, improving the anti-sliding performance of the road surface may effectively reduce the occurrence of collision accidents, such as rear-end collision and slippery, thereby improving driving safety.

Meanwhile, the road asphalt patching tape of the present invention has good low-temperature ductility at a temperature of −40° C. The road asphalt patching tape of the present invention can be used for road surfaces of cement, steel plate and asphalt, and can also be used for foundation pretreatment before construction such as a sealing cover. The road asphalt patching tape of the present invention is not limited by the temperature and the surrounding environment, and can be 100% attached to the diseased treatment surface (diseased road surface). In addition, the area where the construction is completed does not crack, and the diseased road surface is completely sealed.

The asphalt sealing belt can only repair the transverse cracks or longitudinal cracks of the asphalt road surface, whereas the road asphalt patching tape according to the present invention is adapted for the large-area repair regarding the diseases such as turtle shell-shaped cracks, pitted surfaces or the like. Thus, the road asphalt patching tape of the present invention has different processing objects from the asphalt sealing belt.

To sum up, firstly, the road asphalt patching tape according to the present invention has good high-temperature performance, excellent wear resistance to wheels, a very high friction coefficient and good low-temperature ductility. The road asphalt patching tape according to the present invention can be closely attached to and effectively repair the diseased road surface. In this way, the road asphalt patching tape according to the present invention is closely connected to the diseased road surface, which can strengthen the diseased road surface, strengthen the overall strength of the cracked area, prevent the diseases, such as turtle shell-shaped cracks, pitted surfaces or the like, from deteriorating into potholes or the like, and completely seal water from road surface diseases. Secondly, if the diseased road surface is repaired with the road asphalt patching tape according to the present invention, the service life of the road can be effectively extended by 5 to 8 years. Compared with the existing repair method, the road asphalt patching tape according to the embodiments of the present invention can better extend the service life of the road, and has wider applicability, especially in regions with large air temperature changes. And thirdly, when the road asphalt patching tape according to the present invention is used to repair the diseased road surface having turtle shell-shaped cracks, pitted surfaces or the like, it requires shorter construction time than the conventional repair method, needs no large equipment, and is simple in construction. Moreover, the road is open to traffic as soon as the cracks are patched, and the cracks can be patched anytime and anywhere, without causing any damage to the original asphalt road surface. Therefore, the road asphalt patching tape according to the present invention has a wide application prospect.

The aforesaid technical features constitute embodiments of the present invention, and they have strong adaptability and implementation effects. And some non-essential technical features may be added or omitted according to actual needs to meet the requirements of different situations.

I claim:
1. A modified asphalt, comprising;
  raw materials by weight parts:
    100 parts of a base asphalt mixture,
    10 to 14 parts of an oil slurry,
    12 to 15 parts of a rubber modifier,
    3 to 5 parts of modified petroleum resin,
    2 to 4 parts of an anti-stripping agent, and
    10 to 12 parts of carbon black powder,
  wherein the modified asphalt is acquired by performing the following steps:
  heating said 100 parts of said base asphalt mixture to 185° C. to 190° C. so as to form a heated base asphalt mixture,
  adding said 10 to 14 parts of said oil slurry to said heated base asphalt mixture, and stirring so as to obtain a primary stirring slurry;
  adding said 12 to 15 parts of said rubber modifier to said primary stirring slurry and stirring for 2 hours to 4 hours under a temperature of 185° C. to 190° C. so as to obtain a secondary stirring slurry;
  shearing and milling said secondary stirring slurry so as to obtain a primary shear-milling slurry,
  said 3 to 5 parts of said modified petroleum resin to said primary shear-milling slurry so as to form a primary shear-milling slurry with a smooth surface,
  shearing and milling said primary shear-milling slurry with said smooth surface so as to obtain a secondary shear-milling slurry,
  adding said 2 to 4 parts of said anti-stripping agent and said 10 to 12 parts of said carbon black powder to said secondary shear-milling slurry and stirring so as to obtain an asphalt mixture, and
  lowering temperature of said asphalt mixture to 155° C. to 160° C. so as to obtain the modified asphalt.

2. The modified asphalt according to claim 1, wherein said base asphalt mixture is comprised of No. 90 Karamay asphalt and Tahua No. 60 base asphalt with a volume ratio of 6-7:3-4.

3. The modified asphalt according to claim 1, wherein the stirring so as to obtain said asphalt mixture is for 2 hours to 3 hours.

4. The modified asphalt, according to claim 1, wherein said rubber modifier is vulcanized rubber powder.

5. The modified asphalt, according to claim 1, wherein the stirring so as to obtain a primary stirring slurry is at a speed of 55 rpm to 60 rpm.

6. The modified asphalt, according to claim 1, wherein the stirring so as to obtain a secondary stirring slurry is at a speed of 55 rpm to 60 rpm.

7. The modified asphalt, according to claim 1, wherein the stirring so as to obtain said asphalt mixture is at a speed of 55 rpm to 60 rpm.

8. The modified asphalt, according to claim 1, wherein the shearing and milling so as to obtain said primary shear-milling slurry is at a speed of 1200 rpm to 1400 rpm with a colloid miller, and wherein the shearing and milling so as to obtain said primary shear-milling slurry with said smooth surface is at a speed of 1200 rpm to 1400 rpm with said colloid miller.

9. A preparation method of modified asphalt, the method comprising the steps of:
    heating 100 parts of a base asphalt mixture to 185° C. to 190° C. so as to form a heated base asphalt mixture,
    adding 10 to 14 parts of an oil slurry to said heated base asphalt mixture, and stirring to obtain a primary stirring slurry;
    adding 12 to 15 parts of a rubber modifier to said primary stirring slurry and stirring for 2 hours to 4 hours under a temperature of 185° C. to 190° C. so as to obtain a secondary stirring slurry;
    shearing and milling said secondary stirring slurry so as to obtain a primary shear-milling slurry;
    3 to 5 parts of a modified petroleum resin to said primary shear-milling slurry,
    shearing and milling said primary shear-milling slurry so as to obtain a secondary shear-milling slurry,
    2 to 4 parts of an anti-stripping agent and 10 to 12 parts of a carbon black powder to said secondary shear-milling slurry and stirring to obtain an asphalt mixture, and
    lowering temperature of said asphalt mixture to 155° C. to 160° C. so as to obtain a modified asphalt.

10. A road asphalt patching tape, comprising:
    a modified asphalt according to claim 1,
    a crack-proof fiber cloth attached to said modified asphalt,
    a single-silicon white film removably attached to the fiber cloth, and
    gravel attached to said modified asphalt,
    wherein said road asphalt patching tape is acquired by performing the following steps:
    dipping said crack-proof fiber cloth into said modified asphalt so as to form a dipped crack-proof fiber cloth having a thickness of 3 mm to 5 mm, an upper surface, and a lower surface;
    bonding said single-silicon white film on said lower surface of said dipped crack-proof fiber cloth;
    uniformly bestrewing said gravel having a particle size of 5 mm to 10 mm at 6 kg to 8 kg of gravels per square meter on said upper surface of said dipped crack-proof fiber cloth so as to form a bestrewed fiber cloth;
    crushing said bestrewed fiber cloth and embedding said gravel into said bestrewed fiber cloth so as to form an embedded fiber cloth; and
    cooling embedded fiber cloth to 20° C. to 40° C. so as to obtain said road asphalt patching tape.

11. The road asphalt patching tape according to claim 10, wherein the step of bonding said single-silicon white film is comprised of bonding with silicone oil.

12. The road asphalt tape, according to claim 10, wherein said gravel is comprised of basalt chips.

13. The road asphalt tape, according to claim 10, wherein said embedded fiber cloth has a height one quarter to one third of a height of said gravel.

14. A preparation method of road asphalt patching tape, the method comprising the steps of:
    dipping a crack-proof fiber cloth into a modified high-viscosity asphalt according to claim 1 so as to form a dipped crack-proof fiber cloth having a thickness of 3 mm to 5 mm, an upper surface, and a lower surface;
    bonding a single-silicon white film on said lower surface of said dipped crack-proof fiber cloth;
    uniformly bestrewing gravels having a particle size of 5 mm to 10 mm at 6 kg to 8 kg of gravels per square meter on said upper surface of said dipped crack-proof fiber cloth so as to form a bestrewed fiber cloth;
    crushing said bestrewed fiber cloth and embedding said gravels into said bestrewed fiber cloth so as to form an embedded fiber cloth; and
    cooling embedded fiber cloth to 20° C. to 40° C. so as to obtain said road asphalt patching tape.

15. The preparation method of the road asphalt patching tape according to claim 14, wherein the step of bonding said single-silicon white film is comprised of bonding with silicone oil.

16. The preparation method, according to claim 14, wherein said gravel is comprised of basalt chips.

17. The preparation method, according to claim 14, wherein said embedded fiber cloth has a height one quarter to one third of a height of said gravel.

18. An application method of road asphalt patching tape, the method comprising the steps of:
    cleaning a diseased road surface with a diseased road surface so as to form a cleaned diseased road surface with a treatment surface and less dust or sands or stones than said diseased road surface; and
    applying a road asphalt patching tape, according to claim 10, to said treatment surface of said cleaned diseased road surface, said road asphalt patching tape having edges,
    wherein said step of applying comprises the steps of:
        removing said single-silicon white film on said lower surface so as to form an exposed portion on said lower surface of said road asphalt patching tape, and
        attaching said exposed portion on said lower surface of said road asphalt patching tape so as to completely cover said treatment surface so as to form an attaching place; and
        applying force to said attaching place, said edges of said road asphalt patching tape being attached to said diseased road surface.

* * * * *